US008308553B2

(12) United States Patent
Byng

(10) Patent No.: US 8,308,553 B2
(45) Date of Patent: Nov. 13, 2012

(54) METHOD AND SYSTEM FOR DISTRIBUTED SYNDICATE GAMING

(75) Inventor: Stephen William Byng, New South Wales (AU)

(73) Assignee: Aristocrat Technologies Australia Pty Ltd. (AU)

( * ) Notice: Subject to any disclaimer, the term of this patent is extended or adjusted under 35 U.S.C. 154(b) by 977 days.

(21) Appl. No.: 10/840,992

(22) Filed: May 7, 2004

(65) Prior Publication Data

US 2004/0266534 A1 Dec. 30, 2004

(30) Foreign Application Priority Data

May 9, 2003 (AU) ................................ 2003902235

(51) Int. Cl.
*A63F 9/24* (2006.01)
*A63F 13/00* (2006.01)

(52) U.S. Cl. ................ 463/25; 463/16; 463/20; 463/29; 463/42; 273/138.1; 273/138.2; 273/143 R

(58) Field of Classification Search .................... 463/20, 463/25–28, 40–429, 16, 25–2; 700/91; 273/138.1, 273/138.2, 143 R
See application file for complete search history.

(56) References Cited

U.S. PATENT DOCUMENTS

| | | | | |
|---|---|---|---|---|
| 5,179,517 | A * | 1/1993 | Sarbin et al. | 463/25 |
| 5,470,079 | A * | 11/1995 | LeStrange et al. | 463/25 |
| 5,711,715 | A * | 1/1998 | Ringo et al. | 473/9 |
| 5,816,918 | A * | 10/1998 | Kelly et al. | 463/16 |
| 5,967,896 | A * | 10/1999 | Jorasch et al. | 463/25 |
| 6,089,975 | A * | 7/2000 | Dunn | 463/16 |
| 6,168,522 | B1 | 1/2001 | Walker et al. | |
| 6,206,782 | B1 * | 3/2001 | Walker et al. | 463/25 |
| 6,302,793 | B1 * | 10/2001 | Fertitta et al. | 463/25 |
| 6,358,150 | B1 * | 3/2002 | Mir et al. | 463/28 |
| 6,568,680 | B1 * | 5/2003 | Moody et al. | 273/292 |
| 6,652,378 | B2 * | 11/2003 | Cannon et al. | 463/20 |
| 6,666,768 | B1 * | 12/2003 | Akers | 463/40 |
| 6,969,320 | B2 * | 11/2005 | Lind et al. | 463/25 |
| 2003/0064807 | A1 * | 4/2003 | Walker et al. | 463/42 |
| 2003/0092483 | A1 | 5/2003 | Bennett et al. | |
| 2003/0171149 | A1 * | 9/2003 | Rothschild | 463/42 |
| 2004/0135316 | A1 * | 7/2004 | Lipscomb | 273/274 |

OTHER PUBLICATIONS

U.S. Appl. No. 10/204,074, filed Oct. 10, 2002, Luke Nicholas Bennett, Office Action mailed Jun. 25, 2003.
Response to Office Action mailed Jun. 25, 2003 re U.S. Appl. No. 10/204,074, filed Oct. 10, 2002 of Luke Nicholas Bennett.
U.S. Appl. No. 10/204,074, filed Oct. 10, 2002, Luke Nicholas Bennett, Office Action mailed Jan. 29, 2004.
Response to Office Action mailed Jan. 29, 2004 re U.S. Appl. No. 10/204,074, filed Oct. 10, 2002 of Luke Nicholas Bennett.

(Continued)

*Primary Examiner* — Dmitry Suhol
*Assistant Examiner* — Ryan Hsu
(74) *Attorney, Agent, or Firm* — McAndrews, Held & Malloy, Ltd.

(57) ABSTRACT

A gaming system comprising gaming machine terminal means operable by at least one member of a syndicate of members, server means for monitoring interactions on the gaming machine terminal means, wherein the gaming machine terminal means and the server means are linked by a communications network and a syndicate member is able to communicate with another syndicate member using the gaming machine terminal means. A syndicate member is identified to the system through a member identification means and is able to operate the gaming machine terminal means using the member identification means.

10 Claims, 3 Drawing Sheets

OTHER PUBLICATIONS

U.S. Appl. No. 10/204,074, filed Oct. 10, 2002, Luke Nicholas Bennett, Office Action mailed Oct. 19, 2004.
Response to Office Action mailed Oct. 19, 2004 re U.S. Appl. No. 10/204,074, filed Oct. 10, 2002 of Luke Nicholas Bennett.
U.S. Appl. No. 10/204,074, filed Oct. 10, 2002, Luke Nicholas Bennett, Office Action mailed May 13, 2005.
Response to Office Action mailed May 13, 2005 re U.S. Appl. No. 10/204,074, filed Oct. 10, 2002 of Luke Nicholas Bennett.
U.S. Appl. No. 10/204,074, filed Oct. 10, 2002, Luke Nicholas Bennett, Office Action mailed Dec. 23, 2005.
Response to Office Action mailed Dec. 23, 2005 re U.S. Appl. No. 10/204,074, filed Oct. 10, 2002 of Luke Nicholas Bennett.
U.S. Appl. No. 10/204,074, filed Oct. 10, 2002, Luke Nicholas Bennett, Office Action mailed Jul. 25, 2006.
Response to Office Action mailed Jul. 25, 2006 re U.S. Appl. No. 10/204,074, filed Oct. 10, 2002, Luke Nicholas Bennett.
U.S. Appl. No. 10/204,074, filed Oct. 10, 2002, Luke Nicholas Bennett, Office Action mailed Apr. 13, 2007.
Response After Final to Office Action mailed Apr. 13, 2007 re U.S. Appl. No. 10/204,074, filed Oct. 10, 2002, Luke Nicholas Bennett.
U.S. Appl. No. 10/204,074, filed Oct. 10, 2002, Luke Nicholas Bennett, Office Action mailed Oct. 25, 2007.
Brief on Appeal to Final Office Action mailed Oct. 25, 2007 re U.S. Appl. No. 10/204,074, filed Oct. 10, 2002, Luke Nicholas Bennett.
Brief on Appeal to Notification of Non-Compliant Appeal Brief mailed May 2, 2008 re U.S. Appl. No. 10/204,074, filed Oct. 10, 2002, Luke Nicholas Bennett.
U.S. Appl. No. 10/204,074, filed Oct. 10, 2002, Luke Nicholas Bennett, Examiners Answer mailed Aug. 5, 2008.
PartyPoker.com, downloaded from the Internet on May 26, 2009, http://web.archive.org/web/20030130150140/http:/partypoker.com/.

* cited by examiner

METHOD AND SYSTEM FOR DISTRIBUTED SYNDICATE GAMING

PRIORITY INFORMATION

This application claims priority benefits of Australian Application No. 2003902235 filed May 9, 2003 entitled, "Method and System for Distributed Syndicate Gaming," the content of which is incorporated herein by reference.

FIELD OF THE INVENTION

This invention relates to a method and system of distributed syndicate gaming and more particularly relates to a method and system that enables a syndicate of a player or players to be in communication with each other on respective gaming terminals and with a central processing means.

BACKGROUND OF THE INVENTION

Presently there exist gaming systems including a cooperative group gaming apparatus that allows a plurality of players to contribute, participate and share in a group reward when at least one participating player obtains a recognised winning combination on a gaming machine. Such an invention is disclosed in U.S. Pat. No. 6,077,162 to Weiss which involves a plurality of conventional gaming machines all operatively coupled to at least one controller and one or more communal displays. Each machine includes individual play apparatus that is adapted to permit a player to participate in a cooperative group play by contributing a wager to a communal jackpot. The communal wages are communicated from the gaming machines to the controller which controls the communal jackpot value displayed on at least one of the communal displays. When at least one player in the community achieves a recognised winning outcome, all participating players win a portion of the communal jackpot thereby promoting a cooperative gaming experience which provides camaraderie among players both when wagering and winning.

A loyalty based system is disclosed in International Patent Application No WO 01/83062 to the present applicant. A gaming machine awards loyalty points to players playing a particular game out of two different games. The first game, which is a base game, is provided by the slot machine game as a stand alone function with no dependence upon a supporting communications network. The second game is linked to a plurality of networked machines whereby control of the second game is provided by a central game controller and a communications network is controlled by a network controller. The first game is available to all players and the second enhanced game mode is made available to players who have reached a predetermined threshold of loyalty points.

The prior art documents do not disclose a gaming system that allows players to be recognised as individuals and/or be recognised as members of a syndicate that have a common interest or goal and share common assets to be exchanged among the syndicate members. Neither do the documents disclose a system to enable players to use one or more gaming machines simultaneously, preferably through the use of a physical token. The present invention enable groups of players in a syndicate to interact competitively or cooperatively and to be able to communicate through the system. Such communications enable players to share experiences privately of their game play or any other relevant gaming matter involving the syndicate. Furthermore, the prior art documents do not disclose a system that enables tracking of player locations and monitoring the interactions of each of the players via an identity code, through a central processor to enable efficient accounting and recordal of the players in the system.

SUMMARY OF THE INVENTION

According to a first aspect of the invention there is provided a gaming system comprising:

gaming machine terminal means operable by at least one member of a syndicate of members;

server means for monitoring interactions on the gaming machine terminal means;

wherein the gaming machine terminal means and the server means are linked by a communications network and a syndicate member is able to communicate with another syndicate member using the gaming machine terminal means;

wherein a syndicate member is identified to the system through a member identification means and is able to operate the gaming machine terminal means using the member identification means.

The gaming machine terminal means may be one or more gaming machine terminals. The syndicate member may operate any number of the gaming machine terminals using the member identification means.

The gaming system may further comprise data storage means for storing and updating a syndicate account for the syndicate members, the syndicate account enabling any syndicate member to deposit a monetary value or withdraw a monetary value for use in game play on the one or more terminals.

The member identification means, such as code, may be stored or imprinted on a token means and the token means read by a game machine terminal to indicate that the member identified by the member identification means is operating that terminal.

A member may transfer a monetary value from the syndicate account to a terminal used in game play by the member in order to create a session account at that terminal. Each member of a syndicate playing simultaneously on respective terminals in the system may have session balances of other players in the syndicate displayed on their terminal. A session balance may be increased by the member inserting a monetary value at the terminal or transferring a monetary value from the syndicate account. At the conclusion of a session of play by a member, any residual amount of monetary value in the session account may be transferred to the syndicate account.

Any of the members may have a member account representative of a single player syndicate. Each syndicate may be identified by a syndicate identification means, such as a code, and each member of a particular syndicate may be identified to the system through the syndicate identification means.

The data storage means may store the member identification means and syndicate identification means. Interactions monitored by the server means may be stored in the data storage means and associated with the identity of the member of syndicate through the respective member identification means and syndicate identification means. Each terminal and game played may have associated identification means to identify the games and terminals and be linked to a member through the member identification means in order to identify which games and at which terminal a particular member is playing or has played.

Players or members may transmit information or data to each other through the server means and communications network using respective game machine terminals. Such information or data may include any one of messages, shared experiences or the transfer of a monetary value from one member to another member. Alternatively such information or data may be transmitted to a central location, such as the server means, for access by any other member.

According to a second aspect of the invention there is provided a method of syndicate game play in a gaming system that has gaming machine terminal means linked to a server means via a communications network, the method comprising steps of:

enabling game play on the gaming machine terminal means by at least one member of a syndicate of members;

monitoring interactions on the gaming machine terminal means;

enabling a syndicate member to communicate with another syndicate member over the communications network using the gaming machine terminal means;

identifying to the system a syndicate member through a member identification means whereby the syndicate member operates the gaming machine terminal means using the member identification means.

The gaming machine terminal means may be one or more gaming machine terminals. The syndicate member may operate any number of the gaming machine terminals using the member identification means.

The method may further comprise the step of storing and updating a syndicate account of the syndicate members, the syndicate account enabling any syndicate member to deposit a monetary value or withdraw a monetary value for use in game play on the one or more terminals.

The method may further comprise the step of providing token means having the member identification means, such as a code, stored therein or imprinted thereon. The method may further comprise the step of reading the token means, preferably by a game machine terminal, to provide access to play on a terminal and to identify to the system that a particular member is operating or using that terminal.

The method may further comprise a step of transferring a monetary value by a member from the syndicate account to the terminal that the member is using in order to create a session account at that terminal. The method may further comprise a step of displaying session balances of other players in the syndicate simultaneously and the further step of increasing the session balance of a particular member by inserting a monetary value at the respective terminal or by transferring a monetary value from the syndicate account. The method may further comprise the step of transferring any residual amount of monetary value in the session account from the terminal to the syndicate account at the conclusion of a session of play by a member.

BRIEF DESCRIPTION OF THE DRAWINGS

Preferred embodiments of the invention will hereinafter be described, by way of example only, with reference to the drawings wherein.

DETAILED DESCRIPTION OF THE PREFERRED EMBODIMENTS

Figure 1:
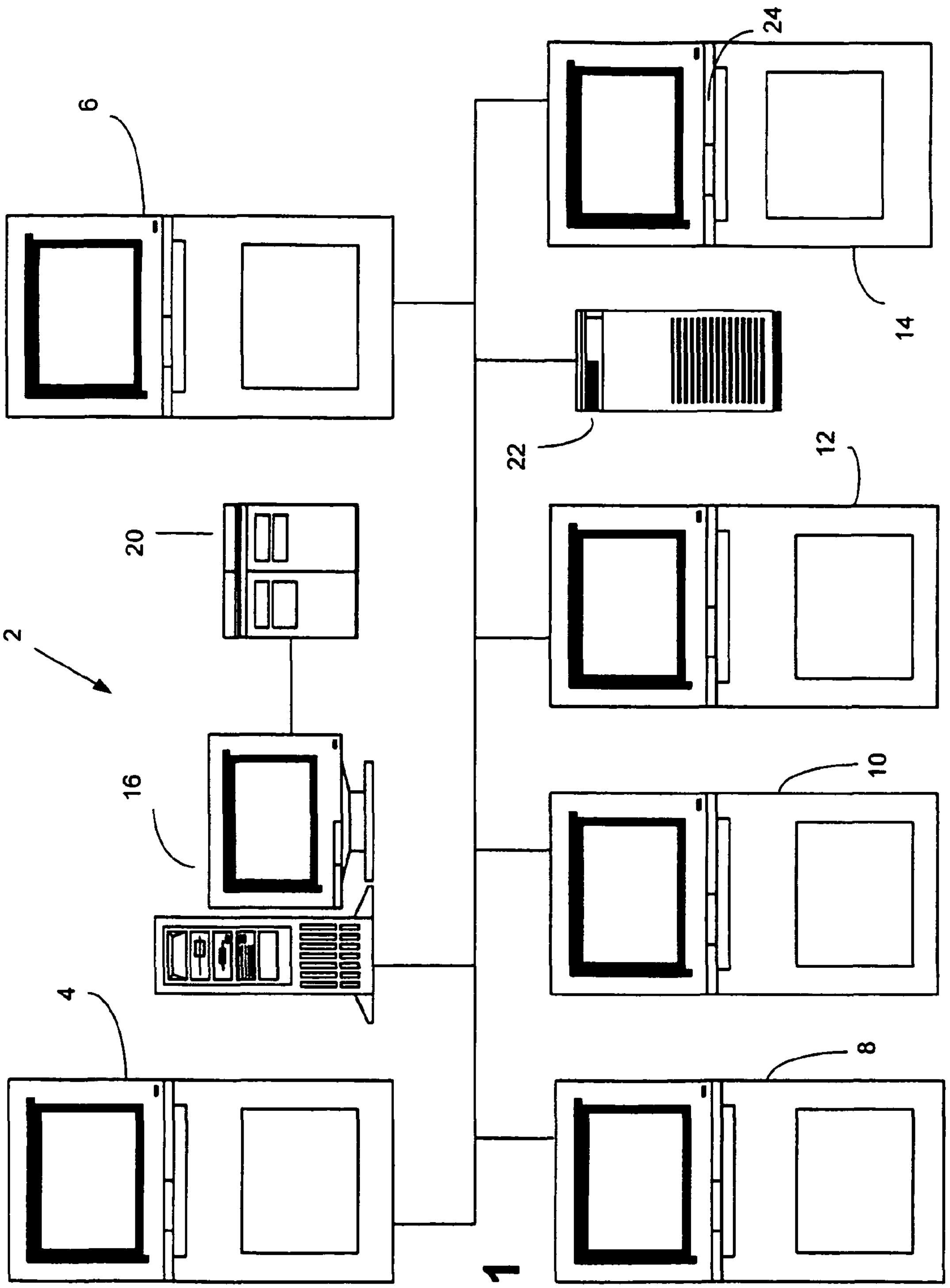
FIG. 1 is a schematic block diagram showing the interconnection of various game machine terminals and a server means to enable game players to play on the game machines and also communicate with other players.

Referring to FIG. 1 there is shown a communication system which enables either individual players or syndicated players to play on gaming machines with each of the interactions of the players being monitored and recorded by the system 2.

Various gaming machine terminals 4, 6, 8, 10, 12 and 14 are each linked to a central server 16 via communications link 18 which may be a bus. Linked to the server 16 is a data storage means 20 for storing identification information on the syndicates representing registered members (such as via codes), among other stored items. A syndicate may comprise one or more players, with for example one player of a particular syndicate playing on game machine terminal 4 and a further player in the same syndicate playing on game machine terminal 6. Each player on their respective game machine terminals has a session balance which indicates how much credit they have left to play with. As syndicate members they are able to monitor each other's session balance, transfer credit or money to each other when the session balance of a particular player is low, inform the other of a large win or another significant event and be able to display a significant event of another syndicate member on their game machine terminal. Thus this system allows communication to be maintained between affiliated players and such communication may involve messages, shared experiences or distribution of money or credit to other players. A kiosk 22 may be provided that enables cash to be withdrawn or deposited between system accounts for players and syndicates. This is generally enabled through a device in the kiosk 22 that allows a player to identify themself and other devices in the kiosk to allow the insertion and collection of money.

A different type of syndicate may be set up where a player uses three gaming machine terminals 8, 10 and 12, identifying himself or herself to the system at each terminal and creating a session balance at each terminal. The session balance may be maintained by inserting money at the particular terminal or transferring money between accounts within the system. The system identifies that player as being at that terminal until a session balance reaches zero or the terminal registers no action for a set period of time. A syndicate account may be stored in the data storage means 20 to which monetary amounts may be transferred and withdrawn from by a particular player associated with the syndicate upon entry of suitable identification means (eg code) or by using a card or token which uniquely identifies that player or syndicate by having a member identification code and/or syndicate identification code imprinted on the token or stored in the token.

Alternatively a single player solely comprising a further syndicate may be a standard player playing on a single terminal 14. The player may be a member of a number of syndicates but has not included himself or herself or has not been included in the sessions of other syndicates. As mentioned previously an identification device or token may be used to identify the player to the system by insertion in slot 24 which is either read by the gaming machine terminal 14 or the server 16.

It is to be noted that a player or players may move from one terminal to another but still have their interactions recorded on identified game machines which read the physical token or card of the player. It is only when play has not been initiated after a set period of time or a session balance on that terminal reaches zero that the session by that particular player is disabled. When information must be reviewed or monitored by the server 16, the system allows the retrieved interactions by a player or a number of players in a syndicate to be associated with the unique player or member identities and the locations as well as their syndicated identity.

Players may share their experiences privately among a syndicate or to associates, by transmitting information to the associate's location or terminal or by publicly transmitting data to a central display area such as at server 16. Any number of players may interact with any number of gaming machine terminals and have all interactions with the system simultaneously monitored and recorded. A player on their own may play multiple terminals as mentioned previously even though they are part of the syndicate, and that single player may interact with multiple machines and have all their interactions within the system simultaneously monitored and associated with their unique identity and the uniquely identified location or terminal. All games played on the various gaming machine terminals are uniquely identified by suitable game identification means such as a code as are players, syndicates and terminals within the system. The system 2 through the server 16 is able to track a player's identity and affiliations, that is memberships with syndicates, and their virtual locations and also the elapsed time that a player has played on a particular terminal. Each of the gaming machine terminals may have a device to handle, that is accept or pay out, monetary units either in the form of cash, or cards or tokens.

Figures 2, 3:
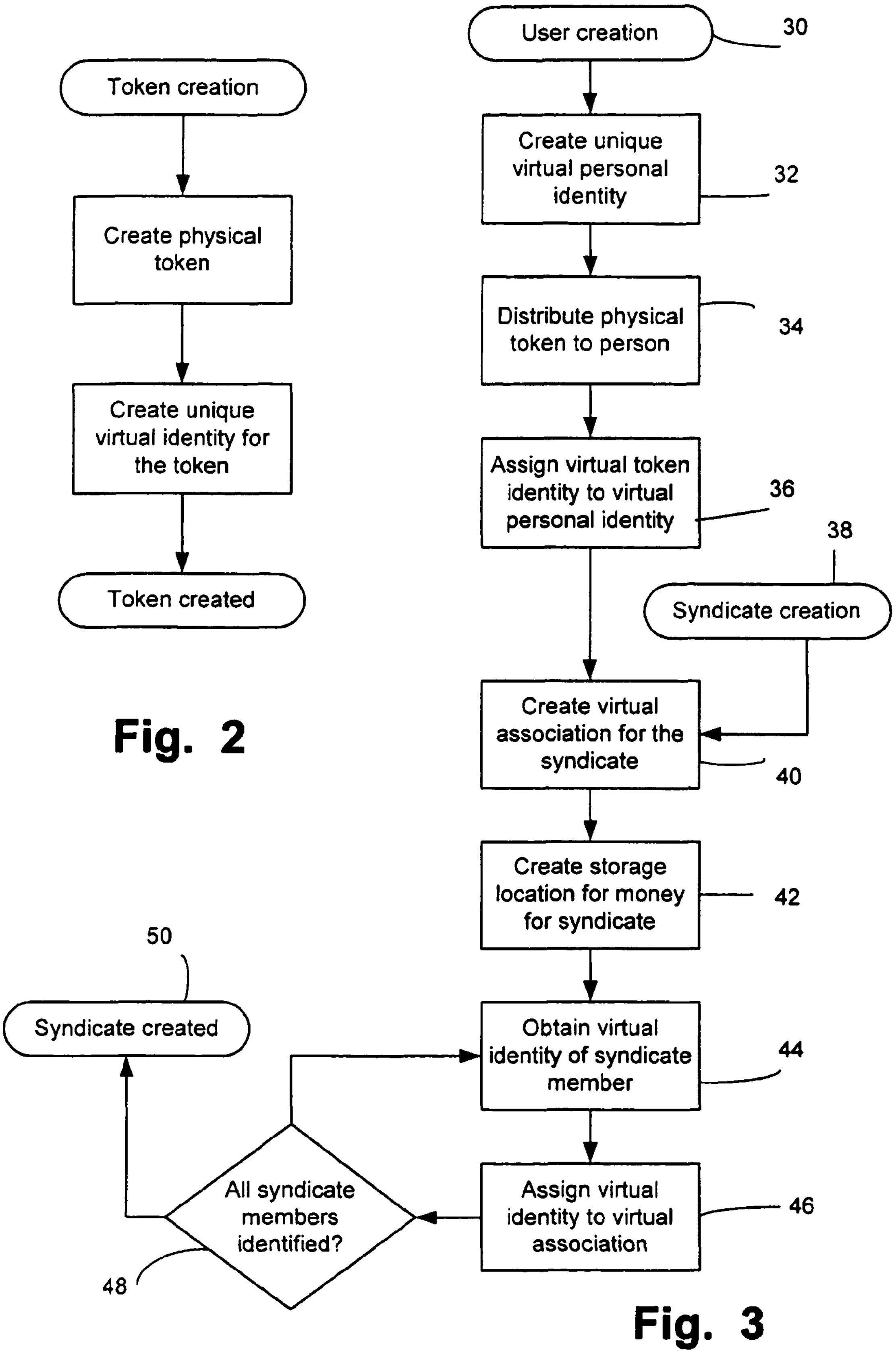
FIG. 2 is a flow diagram showing the creation of a token means used to identify a player and to identify a syndicate (such as via a code)
FIG. 3 is a flow diagram showing the creation of player identities and syndicate identities (such as via codes) and the linking of a particular syndicate with a player or syndicate member.

With reference to FIG. 2 there is shown a series of steps in creating a token to be used by one or more of the players in the system. Each of the tokens has a unique identity within the system. Thus a physical token is created which provides a unique virtual identity for the token to be used by the player.

In FIG. 3 there is shown a flow diagram of how a player can have at least two identities within the system 2. The first identity is as an individual and the second identity is as a syndicate or group member consisting of one or more individuals. The individual is uniquely identified within the system by virtue of the token or card having an identification means such as a code identifying the player. The players are provided with these physical tokens at which time the system associates the token with the individual's unique identity. The system also associates the player with a syndicate, for example a syndicate association may be a monetary account where the association is that the syndicate shares the money among the syndicate members. The syndicate account may reside on the system, particularly in the server 16 or on the data storage means 20. Thus at step 32 a unique virtual personal identity is created (such as via a code) which is either imprinted on or stored on a token means, such as a card, and at step 34 the physical token is distributed to the user or player. At step 36 the virtual token identity is assigned to the virtual personal identity. At step 40 a virtual association is created for the syndicate, such as the sharing of money among the members of the syndicate. At step 42 a storage location is created for the money for the syndicate, such as in a syndicate account stored in the server 16 or in the data storage means 20. At step 44 the virtual identity of the syndicate member is obtained and at step 46 the virtual identity is assigned to the virtual association for the syndicate. At step 48 if all the syndicate members have been identified then the process is complete. Otherwise, the process returns to step 44 until all syndicate members are identified.

Figure 4:
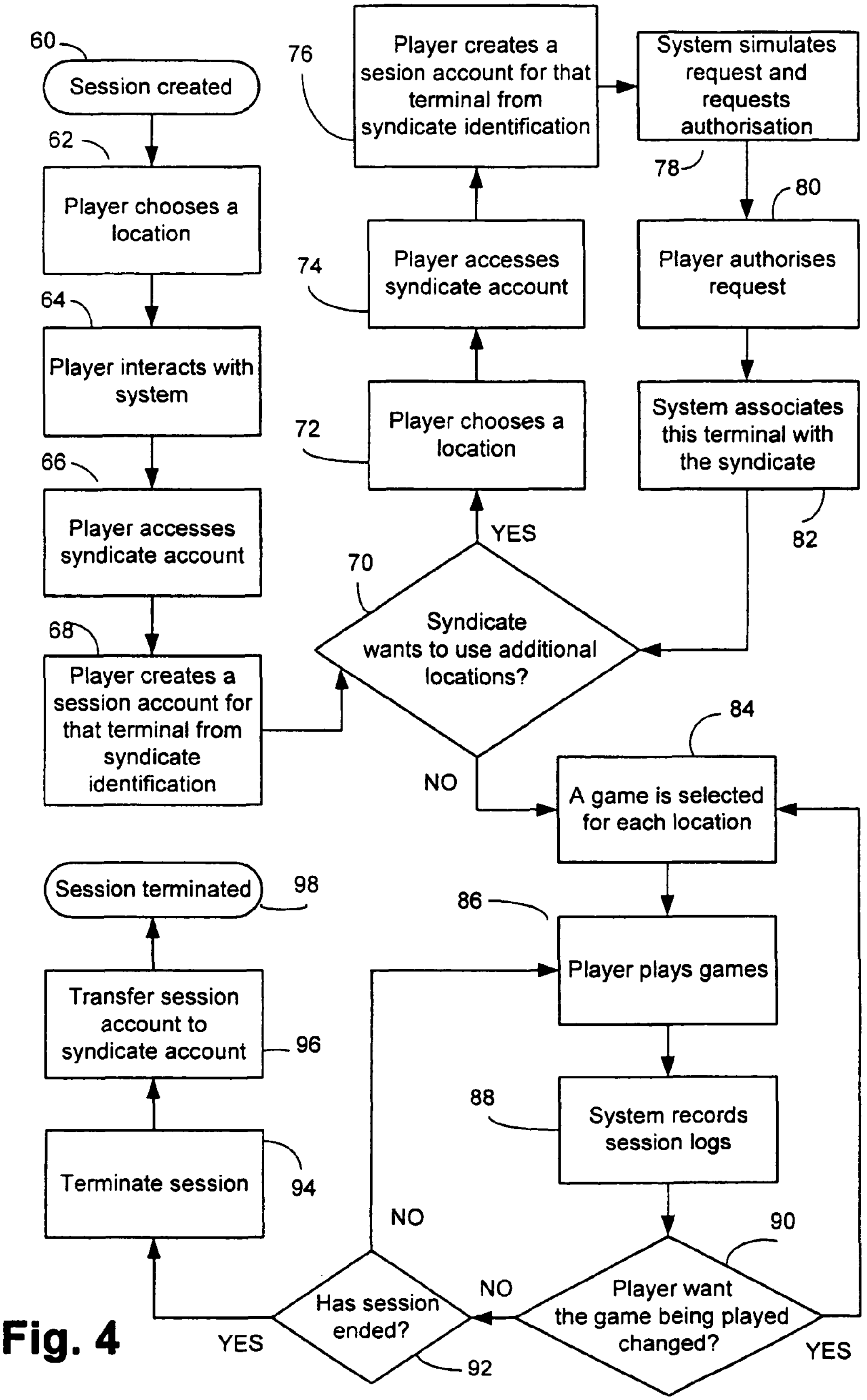
FIG. 4 is a flow diagram showing the virtual identities of players in syndicate play, with particular reference to choosing a terminal on which the player plays and forming a syndicate.

With reference to FIG. 4 there is shown a series of steps used in syndicate play including choice of location or terminal on which each player shall be playing. The terminals may be associated with each other through syndicate associations and as mentioned previously all players, syndicates, games and terminals within the system are uniquely identified by a respective identification means such as a password, number, phrase or code. FIG. 4 depicts the virtual identities of the players in operation which starts with a player choosing a terminal or location at step 62. At step 64 the player interacts with the system by providing the required identity and password as authorisation and verification to interact with the system. At step 66 the player accesses the syndicate account in order to provide the requisite funds for play on that particular terminal and at step 68 the player creates a session account for that terminal from the syndicate identification. This allows the money or monetary values to be traced to the syndicate. The process then moves to step 70 where a decision is made as to whether or not a syndicate requires the use of additional terminals or locations. A single player may play many terminals or locations or there may be many players playing on one or more terminals. Where additional locations or terminals are required the process moves to step 72 where the subsequent player choses a location. It will be a different player if that person has their own identification to use. At step 74 the player accesses the syndicate account and at step 76 creates a session account for that particular terminal from the syndicate identification. At step 78 the system simulates the request and requests authorisation whereupon at step 80 the player authorises the request. At step 82 the system associates this terminal with the particular syndicate and returns to step 70. Where no more additional terminals or locations are required by the syndicate the process proceeds to step 84 where a game is selected for each location and at step 86 the player plays the game. The system records session logs at step 88 which includes player identification, terminal identification, session identification and game identification. At step 90 a decision is made as to whether the player wishes to change the game being played. If yes a new game is selected for that particular location at step 84 and the process proceeds to steps 86 and 88. If the player does not wish to change the game the process moves to step 92 where an enquiry is made as to whether the particular session has ended. If not the player keeps playing the game at step 86 and if so then the session is terminated at step 94. The session account is then transferred to the syndicate account at step 96.

The following three examples are provided to further explain the operation in actual case scenarios during play.

As a first example consider the scenario where players A, B, C and D have formed a syndicate. All players are registered with the system and possess their own identification and have their own accounts, that is a single player syndicate, but also have a joint syndicate account which is a four player syndicate. Each player first chooses a terminal or location and enters the system using their unique identification means such as a code. Each player then transfers money from the joint syndicate account stored in the storage means 20 to the respective terminals that they're playing on and then creates a session account at each terminal, that is four session accounts in total. Each player then selects and plays the games until they each determine that they wish to finish playing. At this time all remaining funds are transferred from the respective terminals back to the joint syndicate account. Thus with reference to FIG. 4 the choosing of a terminal and registering with the system for player A is equivalent to proceeding down path 1 (from step 62 to step 70) and for the next three players B, C and D proceeding down path 2 (from step 72 to step 82 and back to step 70) to chose a terminal and register with the system. All four of them then proceed down path 3 (from step 70 to step 90), path 4 (from step 90 to step 84), path 5 (from step 92 to step 86) and path 6 (from step 92 to step 96) to play respective games.

As a second example player A is the wife of player B. Player A is registered while player B is not. Player A has no money in her syndicate account but as the system regards any number of players as a syndicate, player A may allow player B to represent her in the system as follows. Player A first chooses a terminal and enters the system and then inserts money into the system via the terminal thus creating a session account over path 1 in FIG. 4. She may then transfer money to her syndicate account, that is the player A account and then transfer money from the syndicate account to a designated terminal occupied by player B. Thus a session account is created at that location over path 2. Thus the husband and wife then play games as per normal until completing their gaming whereupon any remaining funds are transferred back to the player A syndicate account. That is, they each then proceed down paths 3, 4, 5 and 6.

As a final example the situation where player A plays alone maybe considered where she wishes to play at adjacent locations. Thus the scenario outlined in the second example could be used. The first example above may also be used if the player possesses multiple tokens to thereby register on a number of game machines or terminals. Alternatively player A may first choose a location and enter the system and thereafter insert money into the system, thus creating a session account over path 1. Player A withdraws her card and inserts it into the adjacent terminal. She thereafter deposits money into the system thus creating a session account again over path 1 on a different terminal. If the player wishes to take advantage of the benefits of a syndicate card she still needs to identify which syndicate she is working with. If she possesses only one syndicate the system will associate play with that single syndicate.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A first gaming machine for providing a game to a first player, the first gaming machine being associated with a plurality of second gaming machines for providing respective games to a plurality of second players, the first player and the plurality of second players being members of a syndicate, the first gaming machine comprising:

a visual display device; and an electronic game control system arranged to cause a visual image to be depicted on the visual display device for display to the player during game play, the visual image comprising:

a first credit meter that depicts a number of wagerable credits available to the first player from an individual account of the first player; and at least one second credit meter that depicts a number of wagerable credits from a syndicate account left to be played by members of the syndicate; and wherein said electronic game control system is arranged to selectively transmit data indicative of a number of wagerable credits between said individual account and said syndicate account for cooperative play of the games by said first player and said plurality of second players.

2. The first gaming machine as claimed in claim 1, wherein the electronic game control system is arranged to:

receive first data from a computer system, via a communication link, that is remote to the first gaming machine; and process the first data to determine the number of wagerable credits available to said plurality of second players.

3. The first gaming machine as claimed in claim 2, wherein the electronic game control system is arranged to:

generate second data that represents the number of wagerable credits available to the first player of the first gaming machine; and send the second data to the computer system via the communication link.

4. The first gaming machine as claimed in claim 1, wherein the electronic game control system is arranged to:

support a player interface that is arranged to allow the first player to initiate a transfer of at least one of the number of wagerable credits available to the first player of the first gaming machine to at least one of the plurality of the second gaming machines;

generate third data that represents the at least one of the number of wagerable credits; and send the third data to the computer system, via the communication link, that is remote to the first gaming machine.

5. The first gaming machine as claimed in claim 4, wherein the electronic game control system is arranged to:

receive fourth data from the computer system via the communication link;

process the fourth data to determine at least one of the number of wagerable credits available to said plurality of second players that said plurality of second players want to transfer to the first gaming machine; and adding the at least one of the number of wagerable credits available to said plurality of second players, which said plurality of second players want to transfer to the first gaming machine, to the number of wagerable credits available to the first player of the first gaming machine.

6. A method for use with a first gaming machine for providing a game to a first player, the first gaming machine being associated with a plurality of second gaming machines for providing respective games to a plurality of second players, the first player and the plurality of second players being members of a syndicate, and that comprises a visual display device, the method comprising the step of causing a visual image to be depicted on the visual display device for display to the player during game play, the visual comprising:

a first credit meter that depicts a number of wagerable credits available to the first player from an individual account of the first player; and at least one second credit meter that depicts a number of wagerable credits from a syndicate account left to be played by members of the syndicate, and shareable with said members of the syndicate; and wherein said electronic game control system is arranged to selectively transmit data indicative of a number of wagerable credits between said individual account and said syndicate account for cooperative play of the games by said first player and said plurality of second players.

7. The method as claimed in claim 6, further comprising the steps of:

receiving first data from a computer system, via a communication link, that is remote to the first gaming machine; and processing the first data to determine the number of wagerable credits available to said plurality of second players.

8. The method as claimed in claim 7, further comprising the steps of:

generating second data that represents the number of wagerable credits available to the first player of the first gaming machine; and sending the second data to the computer system via the communication link.

9. The method as claimed in claim 6, further comprising the steps of:

supporting a player interface that is arranged to allow the first player to initiate a transfer of at least one of the number of wagerable credits available to the first player of the first gaming machine to at least one of the plurality of the second gaming machines;

generating third data that represents the at least one of the number of wagerable credits; and sending the third data to a computer system, via a communication link, that is remote to the first gaming machine.

10. The method as claimed in claim 9, further comprising the steps of:

receiving fourth data from the computer system via the communication link;

processing the fourth data to determine at least one of the number of wagerable credits available to said plurality of second players that said plurality of second players want to transfer to the first gaming machine; and adding the at least one of the number of wagerable credits available to said plurality of second players, which said plurality of second players want to transfer to the first gaming machine, to the number of wagerable credits available to the first player of the first gaming machine.

* * * * *

UNITED STATES PATENT AND TRADEMARK OFFICE

CERTIFICATE OF CORRECTION

PATENT NO. : 8,308,553 B2
APPLICATION NO. : 10/840992
DATED : November 13, 2012
INVENTOR(S) : Byng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1103 days.

Signed and Sealed this
Eighteenth Day of November, 2014

Michelle K. Lee
*Deputy Director of the United States Patent and Trademark Office*